(12) United States Patent
Narsingh

(10) Patent No.: US 10,005,622 B1
(45) Date of Patent: Jun. 26, 2018

(54) HOPPER INSERT WITH CONVERGING OUTLET

(71) Applicant: Wirtgen America, Inc., Antioch, TN (US)

(72) Inventor: Laikram Narsingh, Chambersburg, PA (US)

(73) Assignee: Wirtgen America, Inc., Antioch, TN (US)

( * ) Notice: Subject to any disclaimer, the term of this patent is extended or adjusted under 35 U.S.C. 154(b) by 0 days. days.

(21) Appl. No.: 15/444,410

(22) Filed: Feb. 28, 2017

(51) Int. Cl.
| B65G 11/00 | (2006.01) |
| B65G 47/18 | (2006.01) |
| B65G 11/02 | (2006.01) |
| E01C 19/02 | (2006.01) |

(52) U.S. Cl.
CPC ............ B65G 47/18 (2013.01); B65G 11/026 (2013.01); E01C 19/02 (2013.01)

(58) Field of Classification Search
CPC ........ E01C 19/02; E01C 19/002; E01C 19/48; E01C 19/45; E01C 19/18; E01C 2301/00; B28C 9/00; B65G 11/00; B65G 11/026; B65G 47/18
USPC ........................................ 198/550.2; 193/2 R
See application file for complete search history.

(56) References Cited

U.S. PATENT DOCUMENTS

| 3,394,094 A | 7/1968 | Kayser et al. |
| 3,411,757 A | 11/1968 | Hale et al. |
| 3,484,083 A | 12/1969 | Albertini |
| 3,967,912 A | 7/1976 | Parker |
| 3,997,277 A | 12/1976 | Swisher, Jr. et al. |
| 4,304,504 A | 12/1981 | Trujillo |
| 4,507,015 A | 3/1985 | Furukawa et al. |
| 4,676,690 A | 6/1987 | Allen |
| 4,865,259 A | 9/1989 | Collette |
| 4,934,864 A | 6/1990 | Mauldin |
| 4,964,752 A | 10/1990 | Astrope et al. |
| 5,000,615 A | 3/1991 | Murray |
| 5,215,372 A | 6/1993 | Milstead |
| 5,362,193 A | 11/1994 | Milstead et al. |
| 5,401,115 A | 3/1995 | Musil et al. |
| 5,484,229 A | 1/1996 | Reece |
| 5,641,249 A | 6/1997 | McClelland |
| 5,722,790 A | 3/1998 | Spray |
| 6,007,272 A | 12/1999 | Macku et al. |
| 6,071,040 A | 6/2000 | Macku et al. |
| 6,193,437 B1 | 2/2001 | Heims |
| 7,785,034 B2 | 8/2010 | Hood et al. |
| 7,855,343 B2 * | 12/2010 | Nakagawa ............... B65B 37/18 177/25.18 |
| 7,992,704 B2 | 8/2011 | Weiler |
| 8,092,117 B2 | 1/2012 | Hill et al. |
| 8,545,128 B2 | 10/2013 | Weiler |

(Continued)

OTHER PUBLICATIONS

Ex. A: Photographs and annotated dimensions of a Roadtec hopper insert (2 pp.) (undated but admitted to be prior art).

(Continued)

Primary Examiner — James R Bidwell
(74) Attorney, Agent, or Firm — Lucian Wayne Beavers; Patterson Intellectual Property Law, PC

(57) ABSTRACT

A hopper insert is provided for an asphalt paving machine. The hopper insert has an outlet which has first and second lateral outlet opening edges which converge toward each other from front to rear along at least a majority of the outlet length.

15 Claims, 10 Drawing Sheets

(56) References Cited

U.S. PATENT DOCUMENTS

| | | |
|---|---|---|
| 2003/0035688 A1 | 2/2003 | Vance et al. |
| 2009/0285631 A1 | 11/2009 | Buschmann et al. |
| 2010/0150652 A1 | 6/2010 | Johnson et al. |
| 2011/0002736 A1 | 1/2011 | Monger et al. |
| 2013/0010565 A1 | 1/2013 | Campbell et al. |
| 2016/0108585 A1 | 4/2016 | Blank |
| 2016/0145814 A1 | 5/2016 | Dwegerser |
| 2016/0194838 A1 | 7/2016 | Amstutz et al. |

OTHER PUBLICATIONS

Ex. B: Photographs of a Weiler hopper insert and bolt on upper extension (1 p.) (undated but admitted to be prior art).
Ex. C: Vögele Brochure "MT 3000-2i" (17 sheets) (undated but admitted to be prior art).

\* cited by examiner

HOPPER INSERT WITH CONVERGING OUTLET

BACKGROUND OF THE INVENTION

1. Field of the Invention

The invention relates to hopper inserts for use with asphalt paving machines, and particularly to hopper inserts designed to promote passive remixing of asphalt material and to minimize thermal and mechanical segregation of the asphalt material while retaining adequate surge capacity.

2. Description of the Prior Art

Asphalt paving machines typically have an integral receiving hopper on the front end of the machine which receives asphalt material which is to be spread on the ground by the paving machine. The typical integral receiving hopper of an asphalt paving machine has a relatively low front wall to allow asphalt material to be dumped from a dump truck directly into the hopper.

Additionally, it is known to provide hopper inserts which are placed in the integral receiving hopper of the asphalt paving machine, which hopper inserts increase the volume of asphalt material which can be carried by the asphalt paving machine.

When using a material transfer vehicle (MTV) which is located intermediate between the dump truck and the paving machine, it is common to use a hopper insert, which will have substantially higher walls and capacity than does the integral hopper of the paving machine. The material transfer vehicle (MTV) receives the asphalt material from the dump truck, and then conveys the asphalt material up an elevated conveyor to drop it into the top of the hopper insert located on the paving machine.

One issue which is always important to a successful asphalt paving job is to avoid segregation of the aggregate material in the asphalt mix and to avoid thermal segregation, namely the formation of cool spots, in the asphalt mix.

Segregation problems can be addressed via either active remixing or passive remixing. Passive remixing refers to the design of the various equipment so as to encourage remixing and avoid segregation as the material flows through the equipment. One attempt at such passive remixing is found in the Campbell U.S. Pat. No. 9,109,333 patent. Campbell proposes a hopper insert outlet that diverges from front to rear, i.e. its hopper insert outlet has a narrower front and wider rear. Campbell hypothesizes that by having a narrower front outlet width this will improve the evenness of material flow. But it has been observed that especially when such a hopper insert is in a near empty condition there is a problem of thermal segregation due to stagnation of material in the forward portion of the hopper insert. That stagnation is exacerbated by the narrower front outlet width of Campbell. It is further exacerbated by the extension of the Campbell hopper insert outlet substantially forward of the opening to the underlying conveyor. The last portions of material that flow out of the hopper insert are cooled, especially in the forward portion of the insert, thus resulting in cold spots in the newly formed layer of asphalt material.

There is a continuing need for improvements in asphalt handling equipment to prevent or minimize both aggregate segregation and thermal segregation within the asphalt mix.

SUMMARY OF THE INVENTION

In one embodiment a hopper insert apparatus for an asphalt paving machine, includes a perimeter wall defining a hopper insert interior. The interior has an open upper end for receiving incoming asphalt material, and an open lower end defining an outlet for discharging the asphalt material. An upper end cross-sectional area of the open upper end is greater than an outlet cross-sectional area of the outlet. The perimeter wall includes a front wall portion and a rear wall portion, the front wall portion being sloped forward at a forward sloping angle over at least a majority of a height of the front wall portion to define a forward overhanging volume of the insert interior. The forward overhanging volume is greater than any rearward overhanging volume of the insert interior. The outlet is defined by a forwardmost outlet opening edge, a rearwardmost outlet opening edge, an outlet length being defined along a front to rear centerline of the hopper insert apparatus between the forwardmost outlet opening edge and the rearwardmost outlet opening edge, and first and second lateral outlet opening edges on opposite sides of the centerline, the first and second lateral outlet opening edges converging toward each other from front to rear along at least a majority of the outlet length.

Numerous objects, features and advantages of the present invention will be readily apparent to those skilled in the art upon a reading of the following disclosure when taken in conjunction with the accompanying drawings.

DETAILED DESCRIPTION

Figure 1:
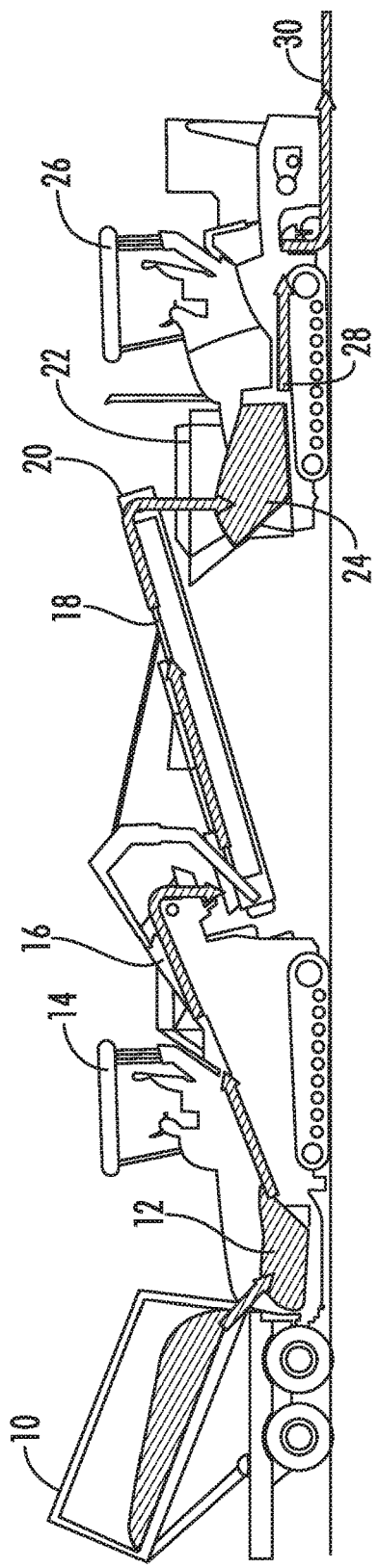
FIG. 1 is a schematic view of the various equipment utilized in an asphalt paving job, including a dump truck, a material transfer vehicle, and an asphalt paving machine including a hopper insert.

FIG. 1 schematically illustrates the major items of equipment utilized in an asphalt paving job. A dump truck 10 is shown depositing asphalt material into a receiving bin 12 of a material transfer vehicle 14.

The material transfer vehicle 14 conveys the asphalt material up a first conveyor 16 to a second conveyor 18. Material exits the upper end 20 of the second conveyor 18 into a hopper insert 22 constructed in accordance with the present invention. The hopper insert 22 is received within an integral hopper 24 on the front of an asphalt paving machine 26. The asphalt paving machine 26 has a horizontally extending conveyor schematically indicated at 28 which runs under the bottom of the integral hopper 24 and carries the asphalt material to the rear of the paving machine 26 where the asphalt material is laid down to form a newly laid asphalt layer 30.

Figure 1A:
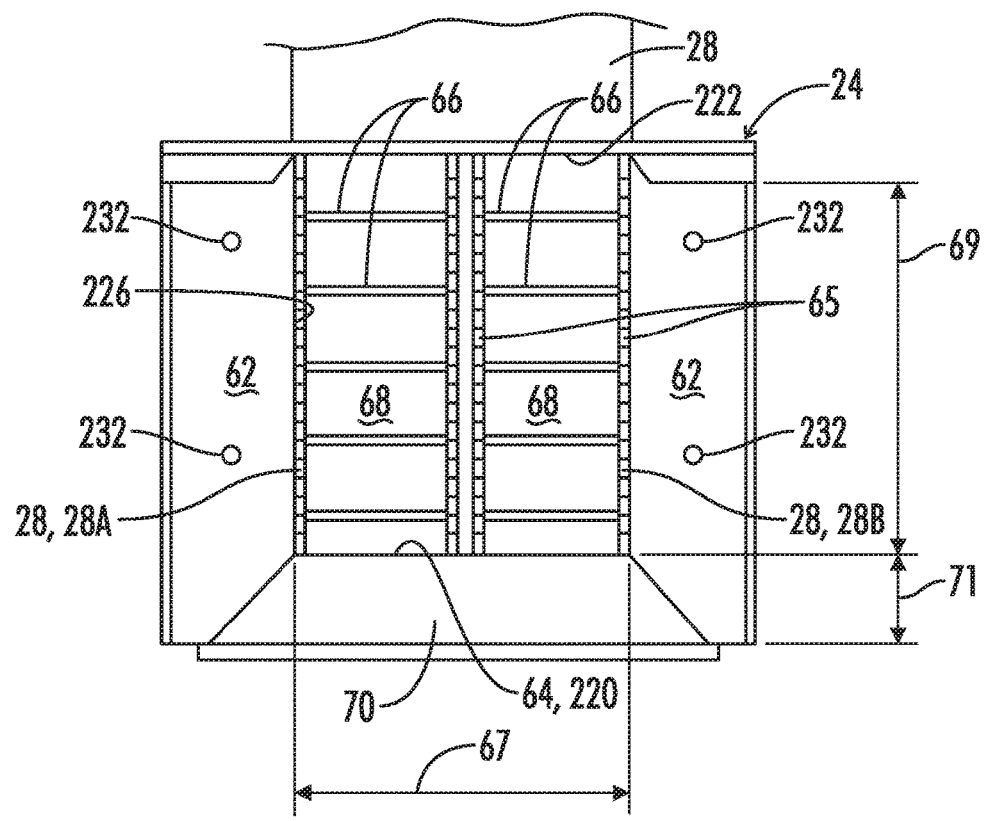
FIG. 1A is a schematic plan view of the integral receiving bin or hopper of an asphalt paving machine, showing the conveyor opening of the asphalt paving machine.

As schematically illustrated in FIG. 1A, the integral hopper 24 of the material transfer vehicle 26 may have a floor 62 with a conveyor opening 64 formed therein. The paving machine conveyor 28 may include two parallel chain flight conveyors 28A and 28B. Each chain flight conveyor includes a pair of parallel spaced chains such as 65 having a plurality of flight bars such as 66 extending therebetween. The flight bars 66 are carried from front to rear by the moving chains 65 so that the flight bars 66 slide across a fixed conveyor plate 68 to convey the asphalt material from front to rear through the paving machine 26. The chains 65 may be covered by a chain cover member 70 to protect them from the particulate material. Typical openings 64 may have a width 67 in a range of from about 52 inches to about 56 inches inches and a length 69 in a range of from about 54 inches to about 58 inches. The integral hopper 24 may also have an apron length 71 forward of the opening 64. The apron length 71 is typically in a range of from about 12 inches to about 18 inches.

Details of construction of one embodiment of the hopper insert 22 are shown in FIGS. 2, 3A-C, and 4.

The hopper insert 22 includes a perimeter wall 32 defining a hopper insert interior 33 having an open upper end 34 and an open lower end or outlet 36. The perimeter wall 32 includes a front wall portion 38, a rear wall portion 40, a left side (from the perspective of the operator of the paving machine 26) wall portion 42, a right side wall portion 44, a left front corner wall portion 46, a right front corner wall portion 48, a right rear corner wall portion 50, and a left rear corner wall portion 52.

The front wall portion 38, rear wall portion 40, left side wall portion 42, and right side wall portion 44 may be generally referred to as four major wall portions. By the term "major wall portion" it is meant that these four wall portions have a longer perimeter on their upper edges than do the other wall portions. In one embodiment, the four major wall portions may be rectangular plates. In another embodiment they may be trapezoidal in shape. In another embodiment each of the side wall portions such as 44 may be made of two triangular plates such as 44A and 44B seen in FIG. 3A.

In an embodiment, the four corner wall portions 46, 48, 50 and 52 may be triangular shaped plates as shown.

The open upper end 34 may be polygonal in shape having eight sides. The lower open end 36 may be four sided. With the use of the lower baffles 56 described below with regard to FIGS. 3B and 3C, the outlet of the lower open end 36 may be considered to be six sided or eight sided.

Figure 2:
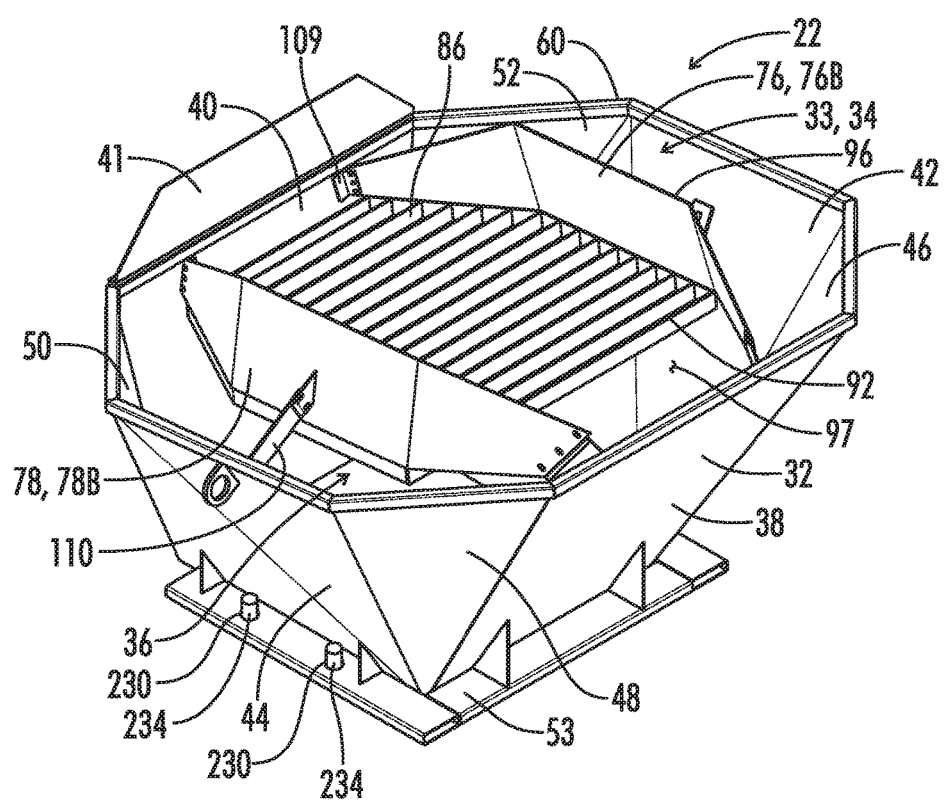
FIG. 2 is a schematic perspective view of one embodiment of a hopper insert.

As seen in FIG. 2, the hopper insert 22 may include an upper extension plate or back plate 41 on the rear wall portion 40 extending substantially vertically upward above the top edge of the perimeter wall 32. The back plate 41 serves as a back stop to retain asphalt material in the hopper insert 22 when that material is being fed into the hopper insert 22 from the conveyor 18 of the material transfer vehicle 14.

A generally horizontal extending lower flange 53 may extend outward from near the lower end of the perimeter wall 32 to provide a base for supporting the hopper insert on the floor 62 of the integral hopper 24 of the paving machine 26. The lower edge of the perimeter wall 32 may extend slightly below the flange 53 to aid in centering the hopper insert 22 in the opening 64 of the paving machine conveyor 28 seen in FIG. 1A. The lower flange 53 may also support the hopper insert on top of the active remixing module 122 described below with regard to FIGS. 6-7.

Figure 3A:
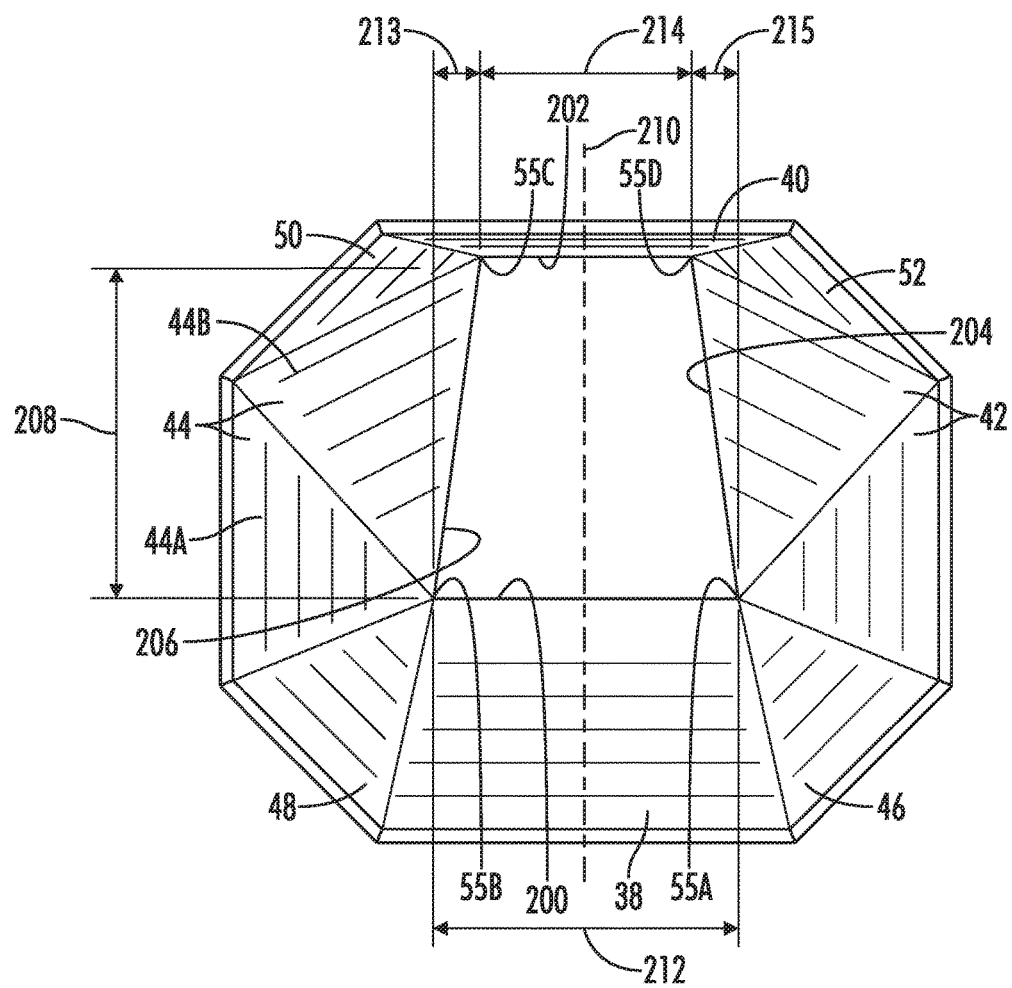
FIG. 3A is a top plan view of the hopper insert of FIG. 2. In the plan views of FIGS. 3A, 3B and 3C the upper baffles and grate have been removed for ease of viewing.

The four major walls 38, 40, 42 and 44 may be joined together at their lower ends to define the open lower end 36 of the hopper insert 22 as a four sided opening having four lower corners 55A, 55B, 55C and 55D as seen in FIG. 3A.

The four major walls slope away from each other along at least a part of a wall height 54 from their lower ends toward their upper ends so that the open upper end 34 is larger than the open lower end 36.

Figure 4:
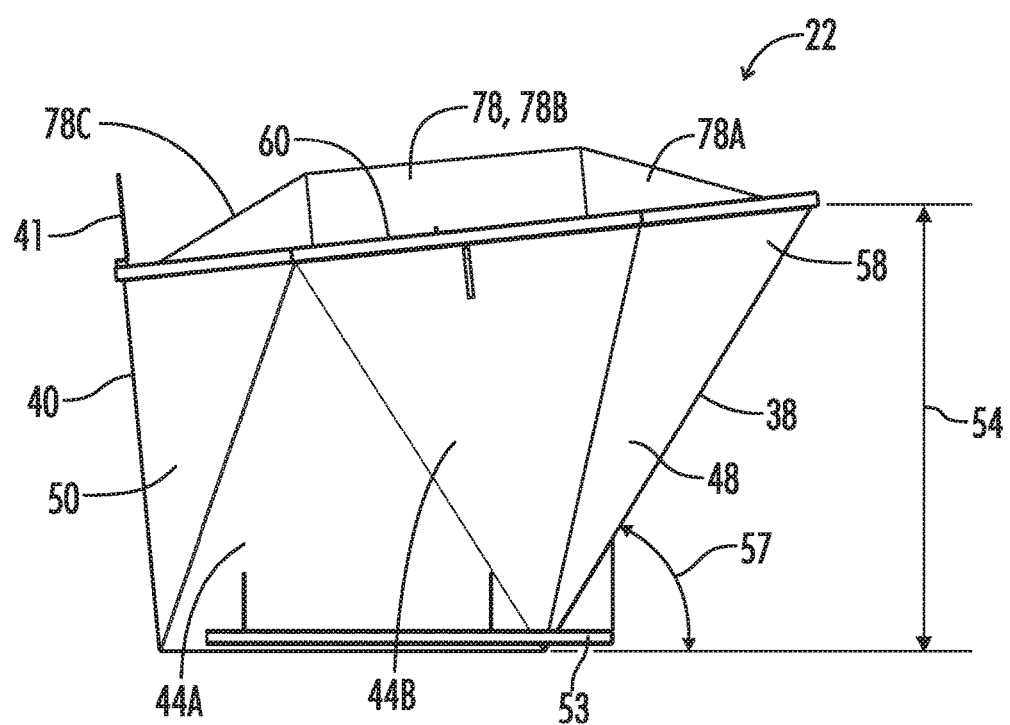
FIG. 4 is a right side elevation view of the hopper insert of FIG. 2.

As best seen in FIG. 4, the front wall portion 38 slopes at a forward sloping angle 57 over at least a majority of a height 54 of the front wall portion 38. This defines a forward overhanging volume 58 of the insert interior 33. The forward overhanging volume is greater than any rearward overhanging volume of the insert interior that may be formed by any rearward slope of the rear wall portion 40. This forward overhanging volume 58 increases the capacity of the hopper insert 22. As is also apparent in FIG. 4, the height 54 of the perimeter wall 32 may decrease from the front wall 38 toward the rear wall 40 so that an upper edge 60 of the side wall such as 44 is sloped downward from front to rear.

As further described below with reference to FIGS. 3B and 3C, there optionally may be lower baffles 56A, 56B, 56C and 56D located above each of the four corners 55A, 55B, 55C and 55D, respectively, each of which baffles covers one of the lower corners and extends laterally inward and downward from the peripheral wall 32. These lower baffles 56A-D serve to divert any material traveling downward in the area of the corners 55A-D laterally inward across the width of the lower opening 36. In the alternative embodiment of FIG. 3B there are two front lower baffles 56A and 56B covering the front lower corners 55A and 55B. In the alternative embodiment of FIG. 3C there are additionally two rear lower baffles 56C and 56D covering the rear lower corners 55C and 55D.

Each of the lower baffles 56 may be formed from a steel plate welded to the inner surfaces of three or four converging walls. For example, the lower baffle 56B as seen in FIG. 3B is welded to walls 38, 48, 44A and 44B and extends laterally inward from those walls over the lower corner 55B of what would otherwise be the lower opening 36 of the hopper insert.

It is noted that depending upon the size of the lower baffles 56A-D and their proximity to the lower end of the perimeter wall 32, the lower baffles 56A-D may also be considered to partially define the shape of the open lower end 36 in which case the open lower end 36 may be considered to be six sided or eight sided.

As seen in FIGS. 2 and 4 the hopper insert 22 may include first and second upper baffles 76 and 78 extending across the open upper end 34 of the hopper insert 22 and supported from the front and rear wall portions 38 and 40 of perimeter wall 32. As is best appreciated in the side elevation view of FIG. 4, each of the upper baffles, such as 76 includes at least a central portion 76B, extending higher than the upper edge 60 of the perimeter wall 32.

As is best seen in FIG. 2, the upper baffles 76 and 78 and particularly their central portions 76B and 78B are spaced transversely away from the perimeter wall 32 and particularly from the corresponding side walls 42 and 44, respectively, of the perimeter wall 32.

As seen in FIG. 2 a grate 86 may extend transversely between the first and second upper baffles 76 and 78. The grate 86 defines an upper grate surface 92 which is preferably located a distance of at least 6 inches, more preferably at least 12 inches, and most preferably about 18 inches, below an uppermost extent or upper edge 96 of the central portion of the upper baffles 76 and 78.

The grate 86 may be dimensioned so that it is superimposed over a majority of the open lower end 36 of the hopper insert 22. More preferably the grate 86 may be superimposed over at least about 80%, and even more preferably at least about 90% of the open lower end 36. The grate 86 may be superimposed over the entire open lower end 36.

Preferably, the grate 86 is spaced from the perimeter wall around at least a majority of the perimeter wall 32. In the embodiment of FIG. 2 the grate may be described as a peninsula shaped grate have one grate bypass 97 adjacent the grate. The bypass 97 will allow asphalt material to bypass the grate 86 if the grate 86 were to become plugged or bridged over with asphalt material. This ensures that a paving job can continue, even if under less than ideal conditions, if a bridging or plugging problem occurs.

A lower edge of the upper baffles 76 and 78, and particularly of the central portions thereof are located lower than the upper edge 60 of the open upper end 34 closest to any respective portion of the upper baffles.

Also the first and second upper baffles 76 and 78 flare downwardly away from each other. This aids in preventing asphaltic material from plugging over or bridging the grate.

A transverse spacing between the upper baffles 76 and 78 varies along a length of the upper baffles 76 and 78 that is in the direction from front to rear or rear to front of the hopper insert 22.

In the embodiments illustrated, each of the upper baffles 76 and 78 may be formed from a bent plate of steel, wherein central portions 76B and 78B of the baffles run substantially front to rear and are parallel to each other. The upper baffles may also be formed of multiple sheets of material joined together. Forward portions 76A and 78A, and rearward portions 76C and 78C of each baffle are bent laterally inward toward the opposed baffle such that starting from front to rear, the transverse spacing between baffles 76 and 78 increases from the front wall portion 38 toward the rear, until the central portions 76B and 78B of the baffles are reached, at which point the spacing becomes constant across the central portion of the hopper insert 22, and then the spacing becomes smaller as the rear wall 40 is approached. This arrangement aids in preventing aggregate material from gathering in a straight line adjacent the lower lengthwise sides of the bottom opening 36 and in general spreads any segregated aggregate over the width of the hopper insert 22 as the aggregate flows downward through the hopper insert 22.

The front and rear ends of the baffles 76 and 78 are attached to the front and rear wall portions 38 and 40, respectively, of the perimeter wall 32. The attachment of baffles 76 and 78 to the wall portions may be by bolts or other suitable fasteners to attach the baffles to mounting tabs such as 109 welded on the interior of the perimeter wall 32. Additionally, lateral braces such as 110 may extend between the side walls 40 and 44 and the adjacent upper baffles.

Embodiment of FIG. 3A

As seen in FIG. 3A the outlet 36 is defined by a forwardmost outlet opening edge 200, a rearwardmost outlet opening edge 202, and first and second lateral outlet opening edges 204 and 206. The outlet 36 has an outlet length 208 defined between the forwardmost outlet opening edge 200 and the rearwardmost outlet opening edge 202 along a front to rear centerline 210 of the hopper insert 22. The first and second lateral outlet opening edges 204 and 206 are located on opposite sides of the centerline 210 and converge toward each other from front to rear along at least a majority of the outlet length 208. This convergence causes any segregated aggregate that rolls down the side walls along the edges 204 and 206 to be spread laterally across the lateral distances 213 and 215 as seen in FIG. 3A. This reduces lengthwise concentrations of segregated aggregate in the newly formed paving 30.

Forwardmost outlet opening edge 200 and the rearwardmost outlet opening edge 202 are parallel to each other and perpendicular to the front to rear centerline 210.

In the embodiment of FIG. 3A, the first and second lateral outlet opening edges 204 and 206 converge toward each other all the way from the forwardmost outlet opening edge 200 to the rearwardmost outlet opening edge 202, thus defining an outlet shape as an isosceles trapezoid.

In one embodiment, the forwardmost outlet opening edge 200 may have a width 212 in a range of from about 52 to about 56 inches, and more preferably of about 55 inches. The rearwardmost outlet opening edge may have a width 214 in a range of from about 38 inches to about 42 inches, and preferably of about 40 inches. The outlet length 208 may be in the range of from about 53 inches to about 55 inches, and preferably about 54 inches. The lateral dimensions 213 and 215 may be in a range of 7 to 9 inches.

With the dimensions of this example, the forwardmost width 212 of the outlet can be described as being in a range of from about 20% to about 50% greater than the rearwardmost width 214.

Figure 3B:
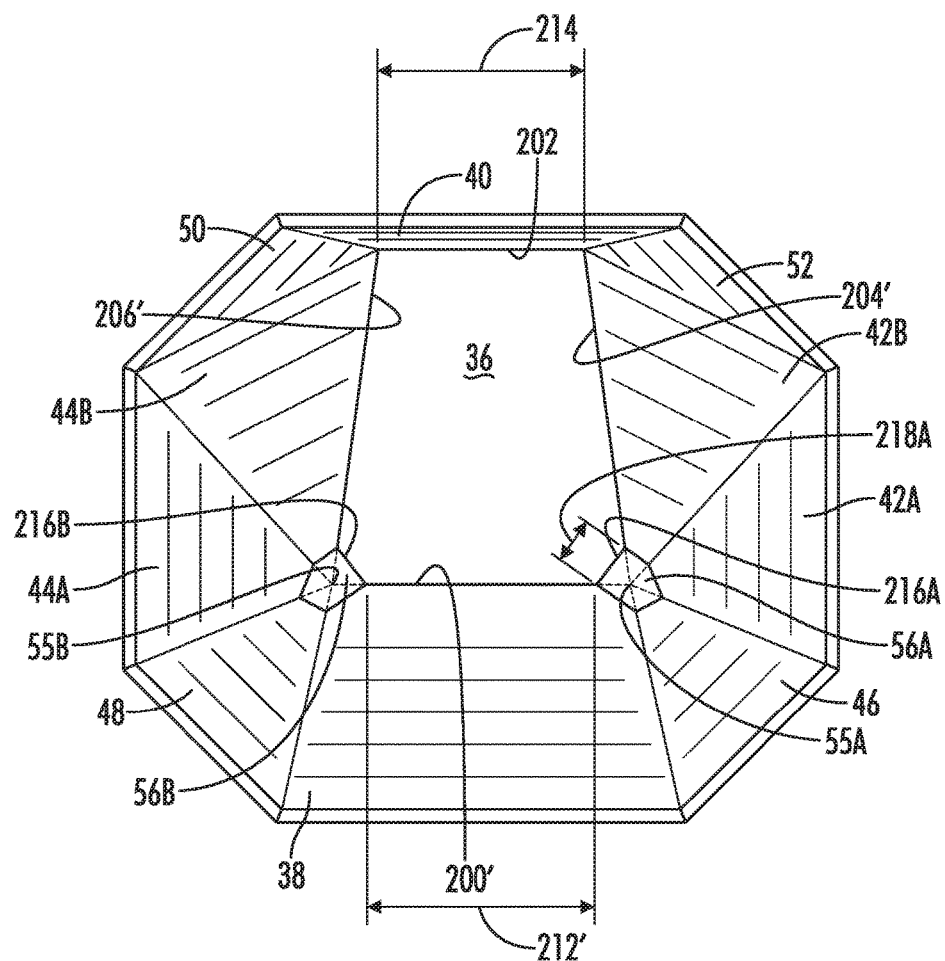
FIG. 3B is a top plan view of a modified hopper insert including front lower baffles.

Embodiment of FIG. 3B.

In FIG. 3B, two front lower baffles 56A, and 56B are located over the two front lower corners 55A and 55B, respectively. With this arrangement, the lower baffles 56A and 56B define front corner outlet edges 216A and 216B, respectively. Thus, the outlet 36 as seen in FIG. 3B may be described as a six sided outlet.

Each of the corner outlet edges such as to 216A can be described as having an outlet edge length, such as 218A, the outlet edge lengths such as 218A each being shorter than the rearwardmost outlet opening edge width 214.

In the embodiment of FIG. 3B, the forwardmost outlet opening edge is designated as 200' and has a length 212' which is reduced with reference to the embodiment of FIG. 3A due to the presence of the lower baffles. Similarly, the straight converging lateral outlet edges 204 and 206 of FIG. 3A are now reduced in length and are designated as 204' and 206'.

In the embodiment of FIG. 3B, the corner outlet edge 216A and the modified outlet edge 204' may collectively be considered to be the first lateral outlet edge connecting the forwardmost outlet edge 200' to the rearwardmost outlet edge 202. Similarly, the corner outlet edge 216B and the outlet edge 206' may collectively be considered to be the second lateral outlet edge connecting the forwardmost outlet edge 200' to the rearwardmost outlet edge 202.

Figure 3C:
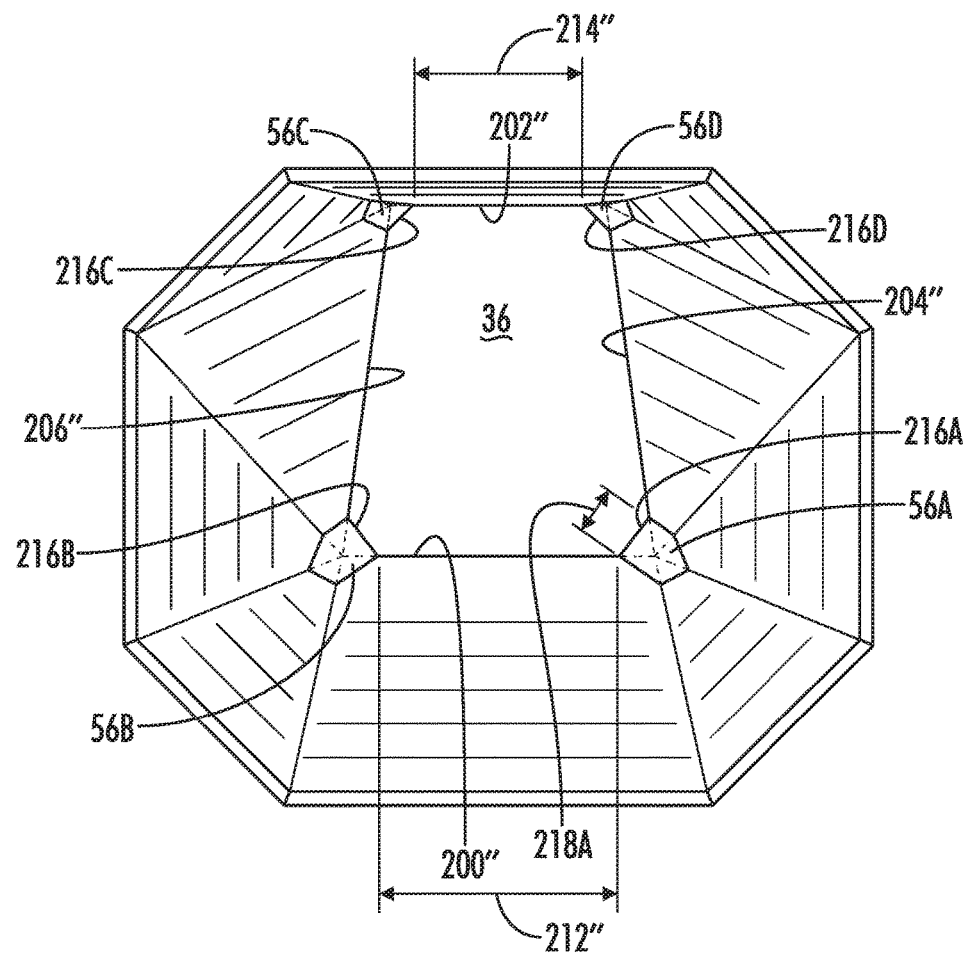
FIG. 3C is a top plan view of a modified hopper insert including front and rear lower baffles.

Embodiment of FIG. 3C

Referring now to FIG. 3C, as compared to the embodiment of FIG. 3B, two rear lower baffles 56C and 56D have been added. Now the outlet 36 may be described as an eight sided outlet having a forwardmost outlet edge 200" having a length 212", and the rearwardmost outlet edge 202" having a length 214". The outlet edges 204", 216A and 216D may collectively be considered to be a first lateral outlet edge connecting the forwardmost outlet edge 200" to the rearwardmost outlet edge 202". The outlet edges 206", 216B and 216C may collectively be considered to be a second lateral outlet edge connecting the forwardmost outlet edge 200″ to the rearwardmost outlet edge 202″.

The outlet 36 shown in FIG. 3C may be described as having diverging front outlet corner edges 216A and 216B and converging rear outlet corner edges 216C and 216D.

Interface Between Hopper Insert and Conveyor Opening

The hopper insert 22 is designed for use in combination with the paving machine 26, as schematically illustrated in FIG. 1. As previously noted with regard to FIG. 1A, the paving machine 26 includes the floor 62 having the conveyor opening 64 defined therein. The conveyor opening 64 is generally rectangular in shape and has a front conveyor opening edge 220, a rear conveyor opening edge 222, and first and second lateral conveyor opening edges 224 and 226. The conveyor opening width 67 is defined along both the front and rear conveyor opening edges 220 and 222.

Figure 8:
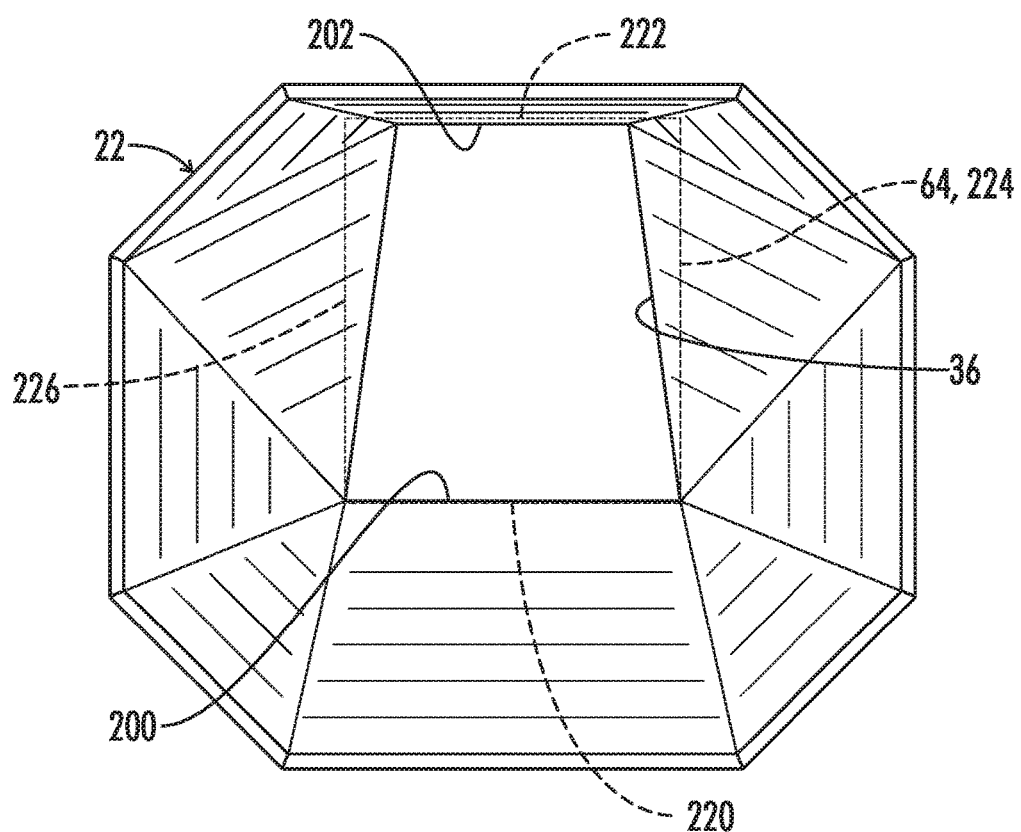
FIG. 8 is a schematic plan view of the hopper insert in place upon the floor of the paving machine, with the outlet of the hopper insert superimposed over the conveyor opening of the paving machine.

FIG. 8 schematically illustrates the hopper insert 22 received on the paving machine 26 with the outlet 36 of hopper insert 22 communicating with the conveyor opening 64. In this view, the outline of the underlying conveyor opening 64 is shown in phantom lines. As schematically shown in FIG. 8, when the hopper insert 22 is received on the asphalt paving machine 26 the outlet 36 of the hopper insert 22 communicates with the conveyor opening 64 of the paving machine 26.

In the embodiment illustrated in FIG. 8, the forwardmost outlet opening edge 200 is substantially superimposed over the front conveyor opening edge 220, and the rearwardmost outlet opening edge 202 is substantially superimposed over the rear conveyor opening edge 222.

In one embodiment, this may be accomplished by having the lower end of the hopper insert 22 actually fitting slightly within the boundary of the conveyor opening 64.

In such an embodiment, the forwardmost outlet opening edge 200 can be described as defining a forwardmost width 212 of the outlet 36 substantially equal to the conveyor opening width 67. More specifically, the forwardmost outlet opening edge may be slightly smaller than the conveyor opening width 67 so that the lower end of the hopper insert 22 can be received in the conveyor opening 64. Preferably the forwardmost width 212 of the outlet 36 is no more than two inches smaller than the conveyor opening width 67.

If the forwardmost outlet opening edge 200 cannot be substantially aligned with the front conveyor opening edge 220, the forwardmost outlet opening edge 200 is preferably spaced forward from the front conveyor opening edge 220 by no more than 6 inches, and preferably no more than 2 inches.

This alignment can be assisted by providing alignment holes and alignment pins between the hopper insert and the conveyor floor 134. Thus as seen in FIG. 2 the lower flange 53 of hopper insert 22 may include alignment holes such as 230 on each side portion of the flange 53. The conveyor floor 134 may have corresponding alignment holes 232 formed therein. Alignment pins 236 may be received through holes 230 and 232 to hold the hopper insert in alignment with the conveyor floor 134.

Passive Remixing

As will be understood by those skilled in the art, asphalt material is comprised of an asphaltic binder mixed with sand and aggregate materials of various sizes. When the asphalt material is mixed in the asphalt production plant from which it is obtained by the trucks 10 shown in FIG. 1, the asphalt material has a relatively uniform distribution of the aggregate materials of various sizes throughout the matrix of asphaltic binder material, and the asphalt material has been heated to a relatively uniform temperature throughout the mixture.

The hot uniform asphalt mixture is then deposited in the trucks 10 which must carry it as quickly as possible to the job site. Two things happen during transport of the asphalt material and during handling of the asphalt material as it is transferred into the truck 10, then from the truck 10 to the material transfer vehicle 14, then from the material transfer vehicle 14 to the asphalt paving machine 26. The material will be subject to non-uniform cooling, particularly while it is sitting in the bed of the truck 10. This problem is exacerbated if the truck 10 must travel a long distance to the job site or if traffic delays are encountered. This non-uniform cooling of the asphalt mixture will allow relatively cool crusts or clumps to form on the surface and the sides of the piled up asphalt material.

Additionally, as the asphalt material is handled, it tends to segregate, and particularly the larger aggregate material at the top of the pile will tend to roll down sloped surfaces of the pile and tend to gather along the edges of any container or conveying device.

Thus it is desirable to avoid such physical and thermal segregation of the asphalt material as it is handled. Through appropriate design the segregation process can even be reversed so that the asphalt material is remixed as it is handled.

Numerous features of the hopper insert 22 contribute to passive remixing of the asphalt material as it flows downward through the hopper insert 22.

First, by depositing the asphalt material on top of the grate 86 and then piling additional asphalt material on top of the grate to increase the pressure on the material resting on the immediate top surface of the grate 86, any larger clumps of material which have formed during the transport procedure will tend to be broken apart by the grate 86 thereby reducing the average size of any clumps of asphalt material as the material flows through the grate 86. To that end, the upper edges of the grate bars 88 are preferably relatively sharp edges to aid in breaking apart the clumps of asphalt material.

Also, as any clumped asphalt material is broken into smaller clumps, this will reduce thermal segregation of the material as the smaller clumps can more easily absorb heat from surrounding hotter asphalt mixture as the material flows downward through the hopper insert 22. Thus clump size reduction and remixing are achieved passively, and the expense of active remixing equipment may often be avoided.

Additionally, the variable width between the upper baffles 76 and 78 prevents any collection of larger aggregates against the upper baffles from being aligned with the length of the hopper insert 22 and thus with the left and right edges of the lower opening 36 thereof. This distributes any such collected aggregate material over a portion of the width of the hopper insert.

Also, the eight sided construction of the upper portions of the perimeter wall 32 reduces material from collecting or stagnating in the typical square corners of typical prior art four sided hopper inserts.

As the material approaches the outlet 36 the rearwardly converging arrangement of the lateral outlet edges 204 and 206 becomes particularly significant. There are several aspects to this. First it has been determined to be important to avoid stagnation of material held in the forward overhanging volume portion 58 of the insert 22. The stagnation problem is particularly acute when the hopper insert is running low on material, and the remaining material in the forward overhanging volume portion 58 of the insert 22 which has been sitting in a stagnate area finally is pulled into the conveyor opening 64. Second it is desirable to distribute across the width of the conveyor 28 any large aggregate material that may collect along the lateral edges 204 and 206 of the outlet 36. Third it is desirable to increase the passive remixing of the material as it is pulled from front to rear by the conveyor.

The first of these aspects is addressed by placing the forwardmost outlet edge 200 as close as possible to the front conveyor opening edge 220 and by maintaining the width 212 of the forwardmost outlet edge 200 substantially equal to the full width 67 of the conveyor opening 64. In this manner a larger volume of material is pulled from the forward overhanging volume of the hopper insert 22 into the conveyor opening 64.

Additionally, in embodiments such as FIGS. 3B and 3C any aggregate material that does tend to collect as it flows downward toward the lower corners 55A-55D of the four sided opening 36 may be deflected laterally inward by the lower baffles 56A-56D as that material nears the lower outlet opening 36.

The second of these aspects is addressed by the rearwardly converging arrangement of the lateral outlet edges 204 and 206. By having those lateral edges converging toward each other from front to rear, any segregated aggregate which does reach those lower edges is spread laterally over the lateral dimensions 213 and 215 as it drops onto the underlying conveyor, thus avoiding a "line" of segregated aggregate being created in the new pavement layer 30.

The third of these aspects is another result of having the wider front edge of the opening 36. By increasing the flow rate of the material from the overhanging volume 58 into the wider front of the opening 36 that material is carried a longer distance by the conveyor 28 thus resulting in more passive remixing of any segregated aggregate that rolls down the front wall 38 of the hopper insert 22.

All of these features working together contribute to the elimination or reduction of the collection of segregated aggregate material along the left and right edges of the conveyor opening 64 into which the material flows when it flows out of the lower opening 36 of the hopper insert 22.

Optional Features of FIGS. 5-8

Figure 5:
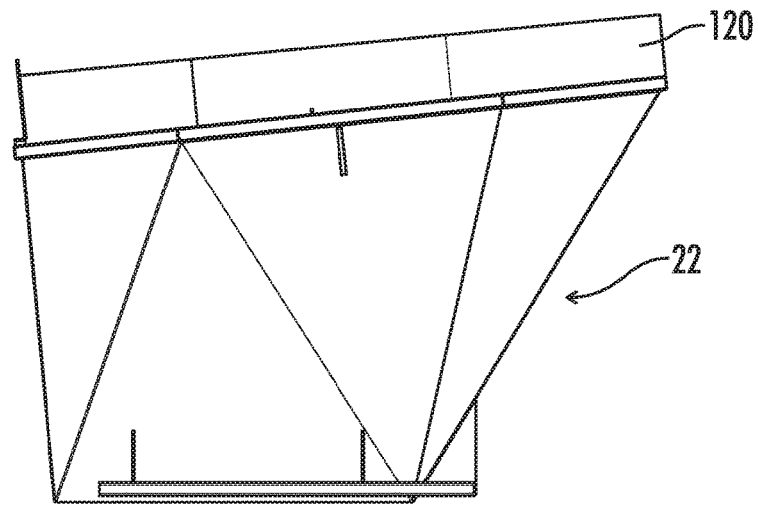
FIG. 5 is a schematic right side elevation view showing an upper hopper extension.

If even greater capacity is required for the hopper insert 22 a vertical extension module 120 may be bolted onto the upper end of hopper insert 22 as schematically illustrated in FIG. 5. The vertical extension module 120 may have a shape in plan view substantially identical to the shape of the top end of hopper insert 22 and can be bolted to the hopper insert 22 as a module in a known manner.

Figure 6:
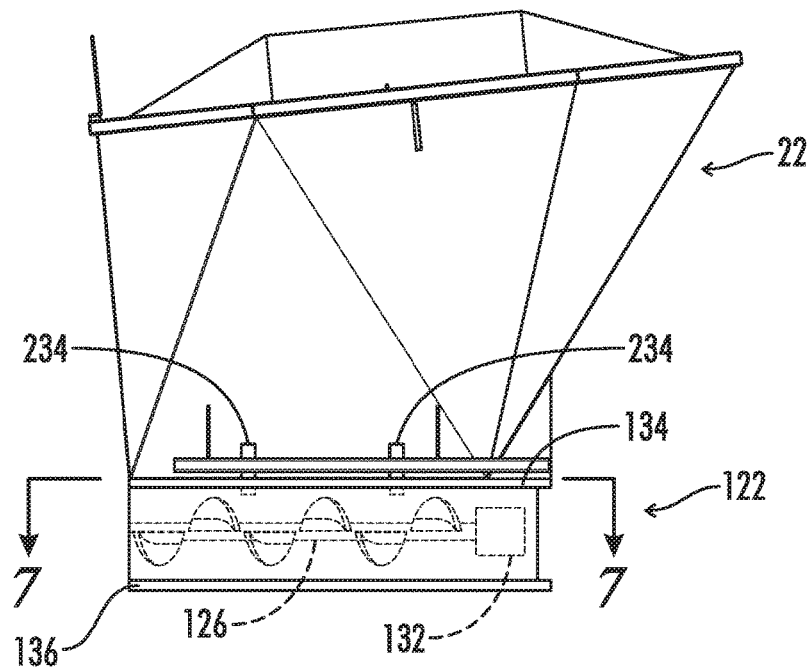
FIG. 6 is a schematic right side elevation view showing an active remixing module mounted below the hopper insert.

Additionally, some mix designs may tend to create more severe segregation and it may be desired to add an active remixing module 122 to the lower end of the hopper insert 22 as schematically illustrated in FIG. 6.

Figure 7:
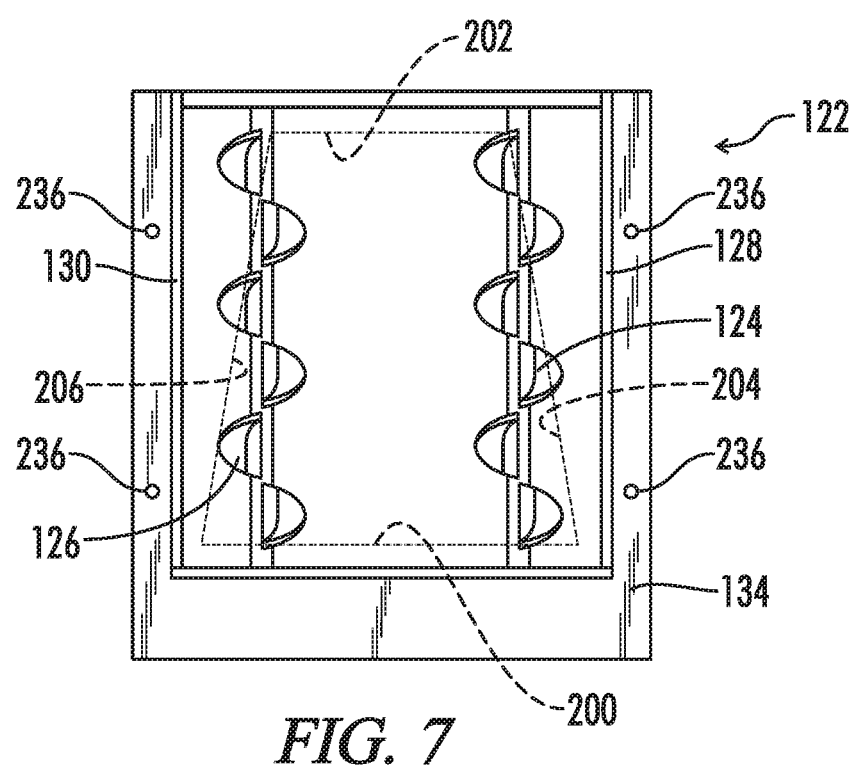
FIG. 7 is a schematic plan view of the active remixing module of FIG. 6.

FIG. 7 shows a schematic plan view of the active remixing module 122 which may for example include two mixers 124 and 126 extending lengthwise near the side walls 128 and 130 of the module 122. The mixers 124 and 126 may be augers or shaft mounted remixing paddles. The placement of the mixers adjacent the side walls 128 and 130 will provide an active remixing of any larger aggregate materials that have segregated and collected adjacent the hopper insert side walls 42 and 44, thus preventing lines of segregated material from forming adjacent the lengthwise sides of conveyor opening 64.

In FIG. 7 the outline of the outlet 36 of hopper insert 22 has been shown in dashed lines superimposed over the active remixing module. There it can be seen that the first and second lateral outlet opening edges 204 and 206 of outlet 36 of hopper insert 22 overlie the first and second lengthwise extending mixers 124 and 126.

The mixer 126 is schematically illustrated in dashed lines in FIG. 6, along with a hydraulic drive motor 132. Each of the mixers will have a drive motor 132, and the drive motors may be powered from the hydraulic system of the paving machine 26. Optionally electric drive motors or any other suitable drive power source may be used for the mixers.

The active remixing module 122 may include an upper flange 134 that connects to the flange 53 of hopper insert 22. The module 122 may have a lower flange 136, similar in shape to flange 53 of hopper insert 22, for resting on the floor 62 of paving machine 26, with the open bottom end of the module 122 opening into the conveyor opening 64.

The active remixing module 122 may have alignment holes 236 therein for receipt of the alignment pins 234 so that the hopper insert 22 and module 222. Similar alignment holes and pins may be provided between the module 122 and the underlying conveyor floor 134.

For those extreme job situations requiring the additional remixing function of the active remixing module 122, the module 122 may be used only when needed and in these extreme situations the active remixing is providing at the last point of handling of the asphalt material before it is actually received on the conveyor 28 of the asphalt paving machine 26, thus providing the active remixing at the most effective point in the flow path of the material. This is contrasted to various prior art systems which use active remixing at earlier stages of the material handling.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A hopper insert apparatus for an asphalt paving machine, the apparatus comprising:
   a perimeter wall defining a hopper insert interior, the interior having an open upper end for receiving incoming asphalt material, and an open lower end defining an outlet for discharging the asphalt material, an upper end cross-sectional area of the open upper end being greater than an outlet cross-sectional area of the outlet, the perimeter wall including a front wall portion and a rear wall portion, the front wall portion being sloped forward at a forward sloping angle over at least a majority of a height of the front wall portion to define a forward overhanging volume of the insert interior, the forward overhanging volume being greater than any rearward overhanging volume of the insert interior; and
   the outlet being defined by:
      a forwardmost outlet opening edge;
      a rearwardmost outlet opening edge, an outlet length being defined along a front to rear centerline of the hopper insert apparatus between the forwardmost outlet opening edge and the rearwardmost outlet opening edge; and
      first and second lateral outlet opening edges on opposite sides of the centerline, the first and second lateral outlet opening edges converging toward each other from front to rear along at least a majority of the outlet length.

2. The apparatus of claim 1, wherein:
the forwardmost outlet opening edge and the rearwardmost outlet opening edge are parallel to each other and perpendicular to the front to rear centerline.

3. The apparatus of claim 2, wherein:
the first and second lateral outlet opening edges converge toward each other all the way from the forwardmost outlet opening edge to the rearwardmost outlet opening edge, defining an outlet shape as an isosceles trapezoid.

4. The apparatus of claim 3, wherein:
the forwardmost outlet opening edge defines a forwardmost width of the outlet, and the rearwardmost outlet opening edge defines a rearwardmost width of the outlet, the forwardmost width being in a range of 20% to 50% greater than the rearwardmost width.

5. The apparatus of claim 3, wherein:
the forwardmost outlet opening edge has a width in a range of 52 to 56 inches;
the rearwardmost outlet opening edge has a width in a range of 38 to 42 inches; and
the outlet length is in a range of 53-55 inches.

6. The apparatus of claim 1, wherein:
the forwardmost outlet opening edge defines a forwardmost width of the outlet, and the rearwardmost outlet opening edge defines a rearwardmost width of the outlet, the forwardmost width being in a range of 20% to 50% wider than the rearwardmost width.

7. The apparatus of claim 1, wherein:
the perimeter wall includes the front wall portion, the rear wall portion and two lateral wall portions joined together at their lower ends to define four lower corners; and
further comprising four lower baffles located above the four lower corners, each lower baffle covering one of the lower corners and extending laterally inward and downward from the peripheral wall so as to divert material travelling downward toward the lower corners laterally inward, the four lower baffles defining diverging front outlet corner edges and converging rear corner outlet edges of the outlet so that the outlet is eight sided, the corner outlet edges each being shorter than the rearwardmost outlet opening edge.

8. The apparatus of claim 1, wherein:
the perimeter wall includes the front wall portion, the rear wall portion and two lateral wall portions joined together at their lower ends to define two front and two rear lower corners; and
further comprising two front lower baffles located above the two front lower corners, each front lower baffle covering one of the front lower corners and extending laterally inward and downward from the peripheral wall so as to divert material travelling downward toward the front lower corners laterally inward, the front lower baffles defining diverging front outlet corner edges, the front corner outlet edges each being shorter than the rearwardmost outlet opening edge.

9. The apparatus of claim 8, further comprising:
two rear lower baffles located above the two rear lower corners, each rear lower baffle covering one of the rear lower corners and extending laterally inward and downward from the peripheral wall so as to divert material travelling downward toward the rear lower corners laterally inward, the rear lower baffles defining converging rear outlet corner edges, the rear outlet corner edges each being shorter than the rearwardmost outlet opening edge.

10. The apparatus of claim 1 in combination with the asphalt paving machine, wherein:
the asphalt paving machine includes a floor having a conveyor opening defined in the floor, the conveyor opening being rectangular and having a front conveyor opening edge, a rear conveyor opening edge, first and second lateral conveyor opening edges, and a conveyor opening width defined along the front and rear conveyor opening edges; and
the hopper insert apparatus is received on the asphalt paving machine with the outlet of the hopper insert apparatus communicating with the conveyor opening.

11. The apparatus of claim 10, wherein:
the forwardmost outlet opening edge defines a forwardmost width of the outlet substantially equal to the conveyor opening width.

12. The apparatus of claim 10, wherein:
the forwardmost outlet opening edge is located no more than six inches in front of the front conveyor opening edge.

13. The apparatus of claim 12, wherein:
the forwardmost outlet opening edge is located no more than two inches in front of the front conveyor opening edge.

14. The apparatus of claim 10, wherein:
the conveyor opening width is in a range of 52 to 56 inches; and
the conveyor opening length is in a range of 54 to 58 inches.

15. The apparatus of claim 1, in combination with an active remixing module located below the hopper insert apparatus, the active remixing module including first and second lengthwise extending mixers, the first and second lateral outlet opening edges of the outlet of the hopper insert apparatus overlying the first and second lengthwise extending mixers.

* * * * *